(12) United States Patent
Elms

(10) Patent No.: US 6,330,141 B1
(45) Date of Patent: Dec. 11, 2001

(54) ELECTRONIC PROTECTIVE RELAY WITH VARIABLE AND FIXED DELAY TALLY TIME OF CURRENT PROTECTION

(75) Inventor: Robert Tracy Elms, Monroeville, PA (US)

(73) Assignee: Eaton Corporation, Cleveland, OH (US)

( * ) Notice: Subject to any disclaimer, the term of this patent is extended or adjusted under 35 U.S.C. 154(b) by 28 days.

(21) Appl. No.: 09/592,305

(22) Filed: Jun. 13, 2000

(51) Int. Cl.[7] ............................ H02H 9/02; H02H 3/00
(52) U.S. Cl. ..................... 361/93.2; 361/94; 700/292; 702/79
(58) Field of Search ................. 361/931, 93.2, 361/93.4, 93.9, 94–96, 97, 62, 63; 700/292, 295, 296; 702/57, 79

(56) References Cited

U.S. PATENT DOCUMENTS

| | | |
|---|---|---|
| 4,056,839 | 11/1977 | Andow . |
| 4,246,623 | 1/1981 | Sun . |
| 4,250,552 * | 2/1981 | Elms ........................................ 702/60 |
| 4,368,500 * | 1/1983 | Conroy, Jr. et al. .................... 361/94 |
| 4,967,304 * | 10/1990 | Dougherty .............................. 361/31 |
| 5,835,325 | 11/1998 | Tripodi et al. . |
| 5,875,088 * | 2/1999 | Matsko et al. ......................... 361/96 |

* cited by examiner

*Primary Examiner*—Kim Hoynh
(74) *Attorney, Agent, or Firm*—Martin J. Moran

(57) ABSTRACT

An electronic protective relay emulates an electromechanical protective relay so that operation of the two types of relays can be coordinated in providing protection in an electric power distribution system. The electronic protective relay incorporates a digital processor which increments a variable delay tally as an inverse current function and a fixed delay tally by a corresponding proportionate amount. During each running of the routine, only the smaller of the two tallies is increased so that they are forced to track one another. When both tallies reach a trip value, a trip signal is generated. The processor also applied a reset function when the measured current is below a pickup value. In accordance with the preferred reset feature, the variable delay tally is reduced using an inverse current function and the fixed delay is reduced by the same amount.

23 Claims, 2 Drawing Sheets

ELECTRONIC PROTECTIVE RELAY WITH VARIABLE AND FIXED DELAY TALLY TIME OF CURRENT PROTECTION

BACKGROUND OF THE INVENTION

1. Field of the Invention

This invention relates to protective relays for electric power distribution systems, and in particular, to an electronic protective relay having an overcurrent trip characteristic which allows its operation to be coordinated with the trip characteristics of prior art electromechanical protective relays found in existing electric power distribution systems.

2. Background Information

Typically, the trip functions of the protective relays controlling the response of a hierarchy of circuit breakers in an electric power distribution system are coordinated so that the breaker closest to the cause of the overcurrent is tripped first to isolate the fault and limit disruption in the system. Coordination is implemented by incorporating a time delay in the trip functions of the upstream protective relays in order to provide an interval for the downstream relays to respond first. If the downstream relay does not respond or the fault is above the downstream protective relay, a trip of the upstream circuit breaker is initiated when the delay times out.

Traditionally, electromechanical relays have been used in such applications. The electromechanical relays provide a delayed trip which is an inverse function of time. A common inverse function is the $I^2t$ function which is a measure of heat generated by an overcurrent condition, although other inverse functions of the general form $I^P$ where the power P can be less than, equal to, or more than 1, are used. In response to an overcurrent above a pickup value, the electromechanical protective relays integrate the selected inverse current function over time and generate a trip signal when the integrated value reaches a selected limit. The physical characteristics of the electromechanical protective relays have the effect of introducing an additional, fixed time delay into the response to an overcurrent. They also have a delay in resetting the integrated value when the current falls below the pickup value.

Electronic protective relays are replacing electromechanical relays for these applications. Typically, the electronic protective relays utilize a microprocessor to implement the selected, or selectable inverse current function. As many systems still incorporate electromechanical protective relays, it is required that the electronic protective relays emulate the electromagnetic relays to assure effective coordination between the two types of relays. Thus, the American National Standard Institute (ANSI) and the International Electrotechnical Commission (IEC) have both established the following response curve to be implemented by the electronic relays:

$$T = D * \left[ \frac{A}{\left(\frac{I}{I_{pu}}\right)^P - 1} + B \right]$$
Equation 1

Where: T=Trip Time in seconds; D=Time Multiplier Setting; $I_{pu}$=Pickup Current Setting; A=Variable Time Delay Setting; B=Fixed Time Delay As can be seen from Equation 1, precise application of this relationship requires a division operation which is computationally burdensome. As a microprocessor is typically performing additional functions such as metering, it is desirable to avoid the need to implement the division function. An approximation of the above function can be generated by just summing the values of $I^P$ for each digital sample properly scaled and adding in the fixed time B. This will work reasonably well were the overcurrent magnitude remains fairly constant which is reasonable in some industrial applications. However, in situations where the fault current changes appreciable in magnitude, significant error results from using this technique. Such changes in fault current can occur, for instance, where the impedance of a fault varies such as when a tree limb blows against a conductor, or where there is an inappropriate response by another protective relay in the system.

There is a need, therefore, for an improved protective relay for an electric power distribution system.

More particularly, there is a need for an improved electronic protective relay which can better emulate an electromechanical relay, but without an excessive computational burden or error.

SUMMARY OF THE INVENTION

These needs and others are satisfied by the invention which is directed to an electronic protective relay for an electric power distribution system which emulates an electromechanical protective relay according to a model which includes a variable inverse current time delay and a fixed time delay. The electronic protective relay in accordance with the invention comprises current sensing means measuring current in the electric power distribution system to generate a measured current value. A processor digitally integrates the measured current using an inverse current function to generate a variable delay tally. The processor also determines a corresponding proportionate amount of the fixed time delay to generate a fixed delay tally. The processor then generates a trip output in response to a combined attainment by the variable delay tally and the fixed delay tally of a selected trip tally. In a general sense, the processor forces the variable delay tally and the fixed delay tally to track one another. In a preferred embodiment of the invention, this is implemented by means within the processor which determines at repetitive intervals which of the variable delay tally and the fixed delay tally is smaller. If the variable delay tally is smaller, variable delay means increases the variable delay tally by using the selected inverse current function and the measured current. If the fixed delay tally is smaller, fixed delay means increases the fixed delay tally by a proportionate amount. In the most preferred embodiment of the invention, the interval is one cycle of the current, so that the measured current is the current for that cycle. The processor also includes means which generate a trip signal when both the variable delay tally and the fixed delay tally are above trip values. As the fixed delay tally is made proportional to the variable delay tally, these trip values can be the same.

Also in accordance with the preferred embodiment of the invention, the tallies are only increased when the measured current is above a pickup value. A reset feature becomes active when the measured current falls below the pickup value. The preferred reset feature comprises means which reduces the variable delay tally using a selected inverse current function, and then reduces the fixed delay tally by the same amount. As an alternative, the reset means can clear both of the tallies when the measured current falls below pickup.

The invention also embraces the method of electronically emulating overcurrent protection provided for an electric power distribution system by an electromechanical protective relay which includes repetitively, at selected intervals, measuring the current to generate a measured current signal, comparing the measured current signal to a stored pickup signal, when the measured current exceeds pickup current, electronically generating from the measured current signal a variable delay tally signal using an inverse current function. The method further includes electronically generating a fixed delay tally which proportionally tracks the variable delay tally and generating a trip signal when the variable delay tally signal and the fixed delay tally signal combined reach a trip signal level. The variable delay tally is increased by the inverse current function when the variable delay tally is less than the fixed delay tally. On the other hand, the fixed delay tally is increased by a corresponding proportion of the fixed delay tally when the fixed delay tally is smaller than the variable delay tally. Preferably, the interval is one cycle of the current.

The method also includes resetting the variable delay tally signal and the fixed delay tally signal when the measured current signal falls below the pickup signal. The resetting is accomplished by reducing the variable delay time by a selected inverse function of time and reducing the fixed delay tally to track reduction in the variable delay tally.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

This invention is directed to an electronic protective relay which emulates the time of current protection function provided by an electromechanical protective relay. In doing so, the electronic protective relay of the invention implements a simplification of the ANSI and IEC time of current protection function as quantified by Equation 1.

Figure 1:
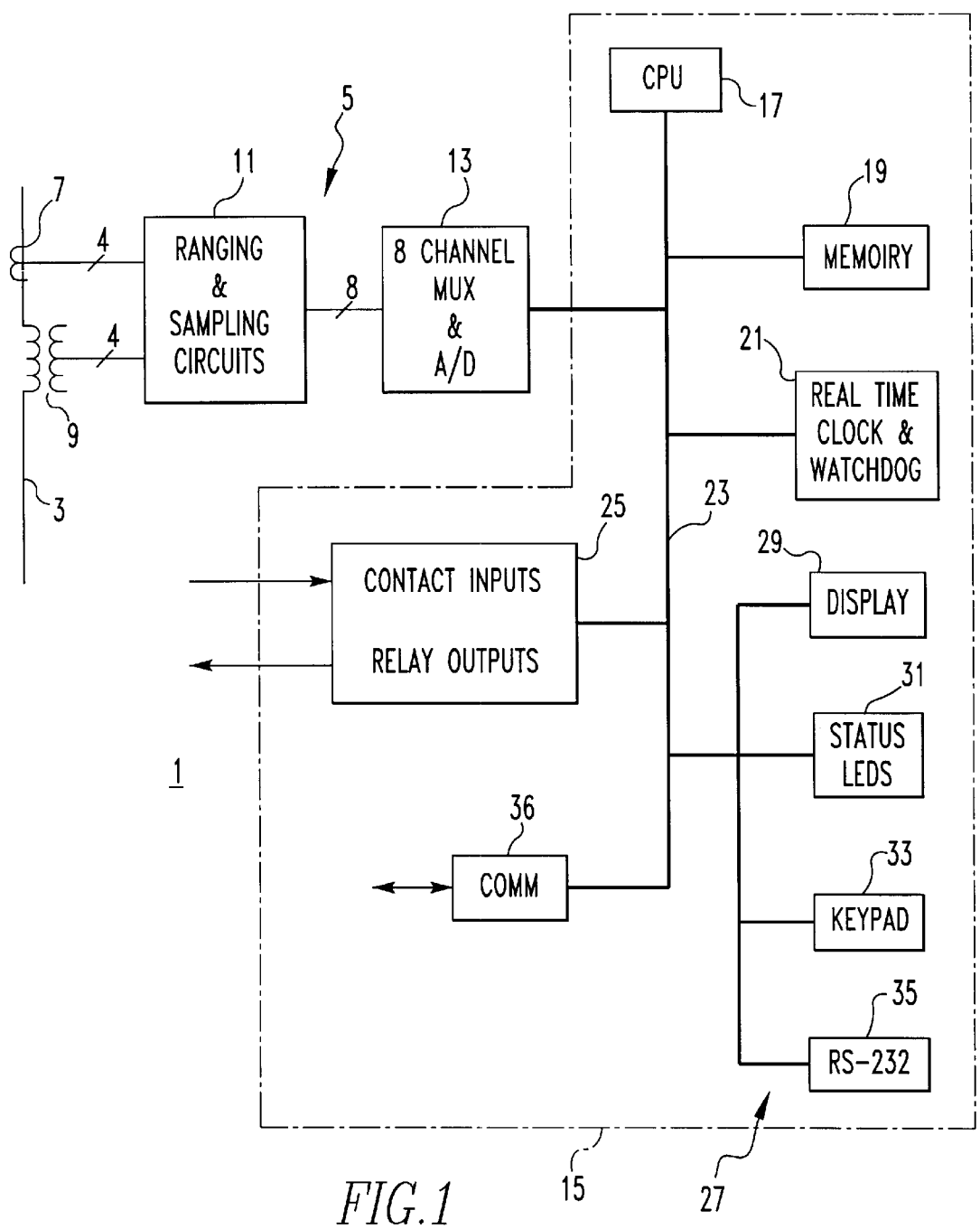
FIG. 1 is a schematic diagram of an electronic protective relay in accordance with the invention.

The electronic protective relay 1 is shown in FIG. 1 providing protection to an electric power distribution system 3. While the electric power distribution system 3 is shown in single line, it will be understood that the system would typically be a multiphase system such as a three-phase system which may also include a neutral. The electronic protective relay 1 has a current and voltage sensing input system 5 which includes a current transformer 7 for each phase, and neutral if provided, for sensing the currents in the distribution system 3, and potential transformers 9 for similarly sensing the voltages. The sensed currents and voltages are conditioned by ranging and sampling circuits 11 and then digitized by a multiplexer and analog to digital converter 13.

The heart of the electronic protective relay 1 is a microprocessor 15 which includes a central processing unit (CPU) 17 with associated memory 19 and real time clock and watchdog 21 all connected by a main bus 23. The microprocessor also has an input/output interface 25 which includes relay outputs such as a trip relay for opening an associated circuit breaker, and contact inputs, such as for example, contacts inputting the status of the associated circuit breaker. The processor 15 also includes a man machine interface 27 which can include a display 29, status light emitting diodes (LEDs) 31, a keypad 33, and an RS-232 connection for connecting, for instance, a hand-held input/output device or portable computer. Optionally, the processor 15 can further include a communication module 36 for connecting the electronic protective relay with other relays and/or a remote monitoring station (not shown).

Figure 2:
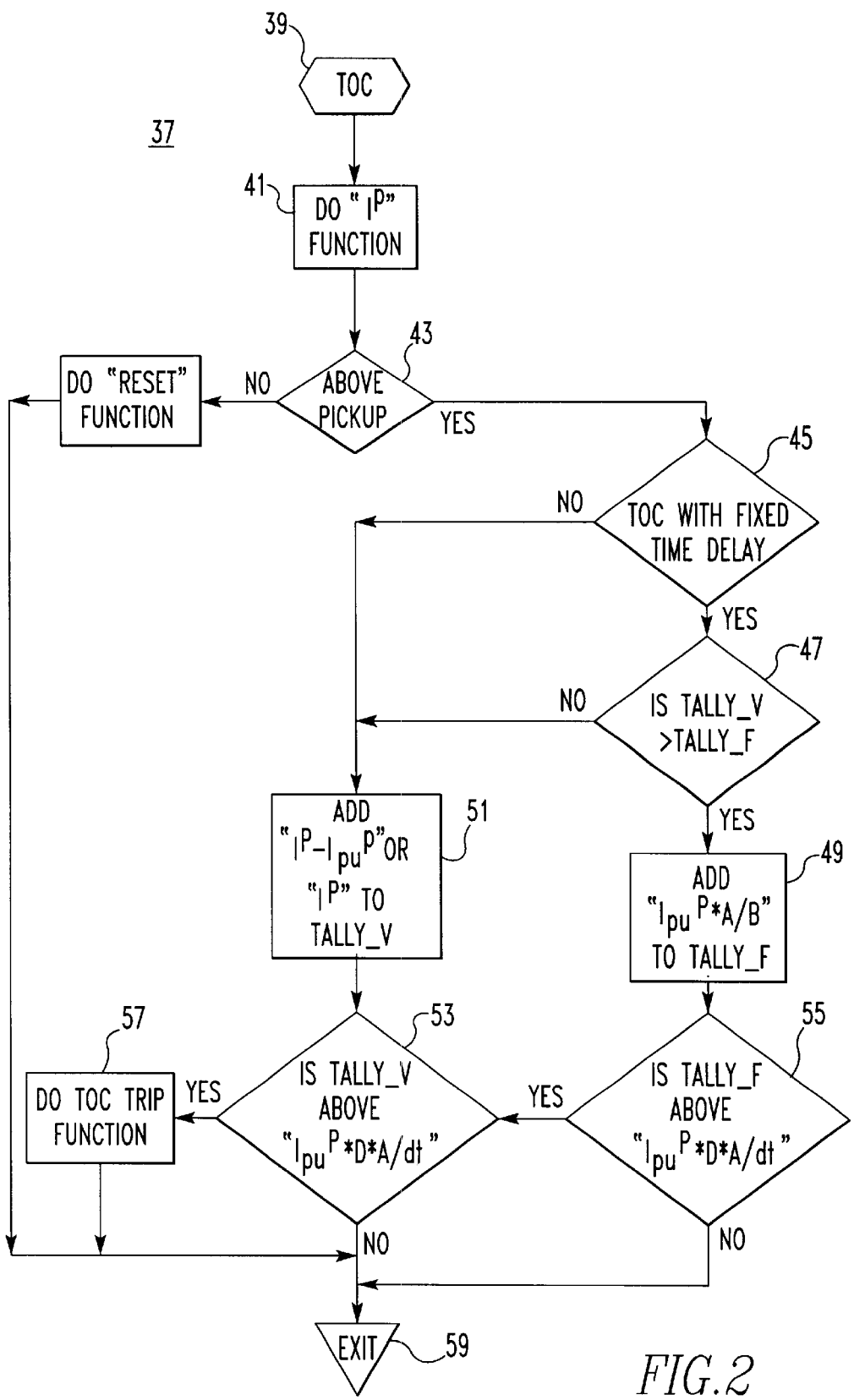
FIG. 2 is a flow diagram utilized by the electronic protective relay of FIG. 1 to implement the invention.

One of the protection functions provided by the electronic protective relay 1 is the time of current (TOC) protection discussed above. As mentioned, the TOC protection function incorporates time delays so that the operation of this protective relay can be coordinated with other relays in the electric power distribution system, including electromechanical protective relays. The processor 15 of the electronic protective relay 1 implements the protection curve defined by Equation 1 using an algorithm 37 outlined in the flow chart of FIG. 2. This TOC routine 37 is called at a selected interval which in the preferred embodiment of the invention is once each cycle of the current in the electric power distribution system. It will be evident that other intervals related to the frequency of the current could be utilized. Upon being called at 39, the measured current I is raised to the power P of the selected inverse current function at 41. The TOC routine maintains two tallies, a tally V for the variable time delay and a tally F for the fixed time delay. The variable time delay tally V is a digital integration of the selected inverse current function and the fixed tally F is a corresponding proportionate tally of the fixed time delay. The proportionality factor is derived from the constant A and the fixed time delay B from Equation 1 and is equal to A/B. This proportionality factor is multiplied by the pickup current $I_{pu}$ raised to the power P of the selected inverse current function. The two tallies V and F are forced to track one another during each run of the TOC routine by only incrementing the smaller of the two tallies.

If the result at block 41 is above a pickup value as determined at 43, and the TOC with fixed time delay function has been selected as determined at 45, a determination is made at 47 as to which tally is smaller. If the fixed tally F is smaller, it is incremented at 49 by adding the proportionate amount. If the variable tally V is smaller at 47, it is incremented at 51 by adding the difference between the measured current raised to the selected power and the pickup current raised to the selected power to the V tally. Alternatively, the measured current raised to the selected power is added to the V tally.

Both of the tallies V, F must have reached a trip tally as determined at 53 and 55, respectively, in order for a trip signal to be generated at 57. The trip function is derived from Equation 1 as:

$$\text{Trip}=I_{pu}{}^{P}*D*A/dt \qquad \text{Equation 2}$$

Where dt is the time between calls of the TOC routine.

If tally V and tally F have not reached the trip value, the routine is exited at 59. By using the proportionality factor, the two tallies are effectively normalized so that the same trip value may be used to determine whether both the variable and fixed time delay have expired. This makes the TOC algorithm 37 much simpler.

The TOC routine 37 also includes a reset feature 61 if the measured current is not above the pickup value at 43. The applicable ANSI reset function is defined by:

$$T_{reset} = \frac{t_r}{\left(\frac{I}{I_{pu}}\right)^2 - 1} \quad \text{Equation 3}$$

Where $t_r$ is a constant with a value determined upon whether the curve is moderately inverse, very inverse, or extremely inverse as defined by ANSI. The V tally is reduced incrementally by the value determined by Equation 3 for each cycle that the measured current is below the pickup value. The fixed time delay tally F is reduced by the same increment as the variable tally V. Alternatively, the reset function 61 can clear the tallies V and F, so that there is no time delay in the reset function.

The electronic protective relay of the invention provides a technique for emulating an electromechanical protective relay so that the electronic relay can be used in an electrical distribution system with, and be coordinated with, existing electromechanical protective relays. The technique is not computationally burdensome which is important in electronic protective relays which are also tasked to perform other functions such as metering. It is particularly advantageous in situations where the overcurrent changes in magnitude. This is so, because the variable delay tally and the fixed delay tally are forced to track each other incrementally and therefore are always at the same proportion of their respective delay times.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An electronic protective relay for an electric power distribution system which emulates an electromechanical protective relay according to a model which includes a variable inverse current time delay and a fixed time delay, said electronic protective relay comprising:

current sensing means measuring current in the electric power distribution system to generate a measured current value; and a processor digitally integrating the measured current using an inverse current function to generate a variable delay tally, determining a corresponding proportionate amount of the fixed time delay to generate a fixed delay tally, and generating a trip output in response to a combined attainment by the variable delay tally and the fixed delay tally of a trip tally.

2. The electronic protective relay of claim 1 wherein said processor comprises tracking means forcing the variable delay tally and the fixed delay tally to track one another.

3. The electronic protective relay of claim 2 wherein the current sensing means generates the measured current value repetitively at a selected time interval and the tracking means comprises means which for each measured current value provided by the current sensing means determines which of the variable delay tally and the fixed delay tally is a smallest tally, and only activates either means using the inverse current function to increase the variable delay tally if the variable delay tally is the smallest tally, or means using the corresponding proportionate amount of the fixed time delay to increase the fixed delay tally if the fixed delay tally is the smallest tally.

4. The electronic protective relay of claim 3 wherein the selected interval is one cycle of the current.

5. The electronic protective relay of claim 4 wherein the processor includes means which only activates either the variable delay tally means or the fixed delay tally means when the current is above a pickup value.

6. The electronic protective relay of claim 5 wherein the processor further includes reset means resetting the variable delay tally and the fixed delay tally when the measured current falls below the pickup value.

7. The electronic protective relay of claim 6 wherein said reset means clears both the variable delay tally and the fixed delay tally.

8. The electronic protective relay of claim 6 wherein the reset means comprises means reducing the variable delay tally each interval by an inverse current function to produce a reduced variable delay tally, and reduces the fixed delay tally by making it equal to the reduced variable delay tally.

9. The electronic protective relay of claim 8 wherein the selected interval is one cycle of the measured current.

10. The electronic protective relay of claim 1 wherein the current sensing means generates the measured current value repetitively at selected intervals.

11. The electronic protective relay of claim 10 wherein the selected interval equals one cycle of the measured current.

12. The electronic protective relay of claim 10 wherein the processor includes reset means which resets the variable delay tally and the fixed delay tally when the measured current is less than a pickup value.

13. The electronic protective relay of claim 12 wherein the reset means resets the variable delay tally and the fixed delay tally incrementally each interval.

14. The electronic protective relay of claim 1 wherein said processor includes means comparing the measured current value to a pickup current value and means generating an increase in either the variable delay tally or the fixed delay tally only when the measured current value exceeds a pickup value.

15. The electronic protective relay of claim 14 wherein the processor means further includes reset means resetting the variable delay tally and the fixed delay tally when the measured current value is less than the pickup value.

16. The electronic protective relay of claim 15 wherein the reset means clears the variable delay tally and the fixed delay tally.

17. The electronic protective relay of claim 15 wherein the reset means comprises means reducing the variable delay tally by an inverse current function to produce a reduced variable delay tally.

18. The electronic protective relay of claim 15 wherein the reset means includes means reducing the fixed delay tally to track the variable delay tally.

19. A method of electronically providing overcurrent protection for an electric power distribution system which emulates protection provided by an electromechanical protective relay, the method comprising the steps of:

repetitively at a selected interval measuring the current to generate a measured current signal;

comparing the measured current signal to a stored pickup signal;

when the measured current signal exceeds the pickup signal, electronically generating from the measured current signal a variable delay tally signal using an inverse current function;

electronically generating a fixed delay tally signal which proportionally tracks the variable delay tally signal; and generating a trip signal when the variable delay tally and the fixed delay tally combined reach a trip signal level.

20. The method of claim 19 wherein the step of increasing the variable delay tally signal by the inverse current function is only carried out for intervals when the variable delay tally signal is less than the fixed delay tally signal, and wherein the step of generating the fixed delay tally signal which proportionally tracks the variable delay tally signal comprises increasing the fixed delay tally signal by a corresponding proportion of the fixed delay time only when the variable delay tally signal is more than the fixed delay tally signal.

21. The method of claim 20 wherein the selected interval is one cycle of the measured current.

22. The method of claim 20 including resetting the variable delay tally signal and the fixed delay tally signal when the measured current signal is less than the pickup signal.

23. The method of claim 22 wherein the step of resetting comprises reducing the variable delay tally signal by a selected inverse current function to generate a reduced variable delay tally signal and reducing the fixed delay tally signal to equal the variable delay tally signal.

* * * * *